(12) United States Patent
Christiansen et al.

(10) Patent No.: US 8,635,520 B2
(45) Date of Patent: Jan. 21, 2014

(54) SYSTEMS AND METHODS FOR COLLABORATIVELY ANNOTATING ELECTRONIC DOCUMENTS

(75) Inventors: Robert N. Christiansen, Bountiful, UT (US); Bryce L. Johnson, Sandy, UT (US)

(73) Assignee: Fourteen40, Inc., River Grove, IL (US)

( * ) Notice: Subject to any disclaimer, the term of this patent is extended or adjusted under 35 U.S.C. 154(b) by 722 days.

(21) Appl. No.: 12/824,009

(22) Filed: Jun. 25, 2010

(65) Prior Publication Data

US 2010/0262659 A1    Oct. 14, 2010

Related U.S. Application Data

(62) Division of application No. 11/469,785, filed on Sep. 1, 2006, now Pat. No. 7,779,347.

(60) Provisional application No. 60/713,812, filed on Sep. 2, 2005.

(51) Int. Cl.
*G06F 17/00* (2006.01)

(52) U.S. Cl.
USPC .......................................... 715/230; 715/231

(58) Field of Classification Search
USPC ................................................ 715/230, 231
See application file for complete search history.

(56) References Cited

U.S. PATENT DOCUMENTS

| | | | |
|---|---|---|---|
| 5,146,552 A | 9/1992 | Cassorla et al. | |
| 6,164,974 A | 12/2000 | Carlile et al. | |
| 6,658,623 B1 | 12/2003 | Schilit et al. | |
| 6,749,434 B2 | 6/2004 | Stuppy | |
| 6,773,266 B1 | 8/2004 | Dornbush et al. | |
| 6,795,864 B2 | 9/2004 | Connor | |
| 7,020,663 B2 | 3/2006 | Hay et al. | |
| 7,162,690 B2 | 1/2007 | Gupta et al. | |
| 7,373,590 B2 * | 5/2008 | Woolf et al. | 715/230 |
| 7,466,323 B2 * | 12/2008 | Krishnamurthy et al. | 345/634 |
| 7,506,246 B2 * | 3/2009 | Hollander et al. | 715/230 |
| 7,555,705 B2 | 6/2009 | Chen et al. | |
| 7,730,391 B2 * | 6/2010 | Madam | 715/233 |
| 7,765,206 B2 * | 7/2010 | Hillis et al. | 707/723 |
| 7,844,891 B2 * | 11/2010 | Chandra | 715/208 |
| 7,962,846 B2 * | 6/2011 | Lerner et al. | 715/230 |
| 8,327,260 B2 * | 12/2012 | Bays et al. | 715/230 |
| 2002/0010707 A1 | 1/2002 | Chang et al. | |
| 2002/0012134 A1 | 1/2002 | Calaway | |
| 2002/0049787 A1 | 4/2002 | Keely et al. | |

(Continued)

OTHER PUBLICATIONS

Marshall et al., Exploring the Relationship between Personal and Public Annotations, ACM 2004, pp. 349-357.*

(Continued)

*Primary Examiner* — Cong-Lac Huynh
(74) *Attorney, Agent, or Firm* — Kory D. Christensen; Stoel Rives LLP (57) ABSTRACT

Systems and methods for sharing annotations associated with an electronic document. The annotations are created by one or more annotation authors and are shared with one or more other users. A method includes determining frequently annotated portions of the electronic document and providing indicators within the electronic document of the frequently annotated portions. In one embodiment, frequently used words within the annotations are also indicated within the text of the electronic document. In addition, or in another embodiment, the annotations can be searched based on a user's location within the electronic document.

11 Claims, 9 Drawing Sheets

(56) References Cited

U.S. PATENT DOCUMENTS

| | | | |
|---|---|---|---|
| 2003/0070139 A1 | 4/2003 | Marshall et al. | |
| 2003/0081000 A1 | 5/2003 | Watanabe et al. | |
| 2003/0197729 A1 | 10/2003 | Denoue et al. | |
| 2004/0003352 A1 | 1/2004 | Bargeron et al. | |
| 2004/0122912 A1 | 6/2004 | Kim et al. | |
| 2004/0139400 A1* | 7/2004 | Allam et al. | 715/526 |
| 2004/0153504 A1 | 8/2004 | Hutchinson et al. | |
| 2004/0205542 A1 | 10/2004 | Bargeron et al. | |
| 2004/0205547 A1 | 10/2004 | Feldt et al. | |
| 2004/0260717 A1 | 12/2004 | Albornoz et al. | |
| 2005/0055628 A1 | 3/2005 | Chen et al. | |
| 2005/0125714 A1* | 6/2005 | Freeman et al. | 715/500.1 |
| 2005/0132281 A1 | 6/2005 | Pan et al. | |
| 2005/0160355 A1 | 7/2005 | Cragun et al. | |
| 2005/0160356 A1 | 7/2005 | Albornoz et al. | |
| 2005/0192881 A1 | 9/2005 | Scannell | |
| 2006/0005117 A1 | 1/2006 | Yamashita et al. | |
| 2006/0015811 A1 | 1/2006 | Tanaka et al. | |
| 2006/0020882 A1* | 1/2006 | Beezer et al. | 715/512 |
| 2006/0041538 A1 | 2/2006 | King et al. | |
| 2006/0047639 A1 | 3/2006 | King et al. | |
| 2006/0053364 A1 | 3/2006 | Hollander et al. | |
| 2006/0085734 A1* | 4/2006 | Balnaves | 715/512 |
| 2006/0090127 A1 | 4/2006 | Silverbrook et al. | |
| 2006/0143558 A1* | 6/2006 | Albornoz et al. | 715/512 |
| 2006/0161578 A1 | 7/2006 | Siegel et al. | |
| 2007/0047780 A1 | 3/2007 | Hull et al. | |
| 2007/0271503 A1 | 11/2007 | Harmon et al. | |
| 2008/0005086 A1* | 1/2008 | Moore | 707/3 |
| 2008/0098294 A1* | 4/2008 | Le | 715/230 |
| 2008/0109713 A1* | 5/2008 | Frank et al. | 715/230 |
| 2009/0037805 A1* | 2/2009 | Theobald | 715/230 |
| 2009/0199082 A1* | 8/2009 | Hollander et al. | 715/230 |
| 2009/0204882 A1 | 8/2009 | Hollander et al. | |
| 2009/0228126 A1 | 9/2009 | Spielberg et al. | |
| 2009/0271381 A1* | 10/2009 | Beezer et al. | 707/3 |
| 2010/0017701 A1 | 1/2010 | Bargeron et al. | |
| 2010/0070845 A1* | 3/2010 | Facemire et al. | 715/230 |
| 2010/0211864 A1* | 8/2010 | Hengel et al. | 715/230 |
| 2010/0318893 A1* | 12/2010 | Matthews et al. | 715/230 |
| 2011/0113320 A1* | 5/2011 | Neff et al. | 715/230 |
| 2011/0178981 A1* | 7/2011 | Bowen et al. | 707/608 |
| 2011/0219325 A1* | 9/2011 | Himes et al. | 715/771 |
| 2012/0036423 A1* | 2/2012 | Haynes et al. | 715/230 |

OTHER PUBLICATIONS

Cadiz et al., Using Web Annotations for Asynchronous Collaboration around Docuemnts, ACM 2000, pp. 309-318.*

Hsu et al. Multimedia Data Management for Process Control, IEEE 1994, pp. 332-341.*

Wu et al., Exploring Social Annotations for the Semantic Web, ACM 2006, pp. 417-426.*

Li et al., Real-Time Computerized Annotation of Pictures, IEEE 2008, pp. 985-1002.*

"Live, group note-taking—Five People in a meeting? Take one set of notes instead of five," Jotspot Live, http://jotlive.com/ (last accessed Aug. 9, 2006).

Brush et al., Generating Transformational Annotation for Web Document Adaptation: Tool Support and Empirical Evaluation, Google 2004, pp. 1-18.

Lawton et al., The Knowledge Weasel Hypermedia Annotation System, ACM 1993, pp. 106-117.

Cadiz et al., Using Web Annotations for Asynchronous Collaboration around Documents, ACM 2000, pp. 309-318.

Guthrie et al., Large Scale Experiments for Semantic Labeling of Noun Phrases in Raw Text, Google 2004, pp. 1-4.

Brush et al., "Robust Annotation Positioning in Digital Documents," ACM 2001, pp. 285-292.

Office Action mailed Oct. 8, 2009, for U.S. Appl. No. 11/469,785, filed Sep. 1, 2006.

Notice of Allowance and Fee(s) Due mailed Jun. 1, 2010, for U.S. Appl. No. 11/469,785, filed Sep. 1, 2006.

* cited by examiner

Annotation Population:
New Haven Law School, Class of 2010, Cases and Problems of Software Patent Law 3rd Edition

FIG. 13

SYSTEMS AND METHODS FOR COLLABORATIVELY ANNOTATING ELECTRONIC DOCUMENTS

CROSS-REFERENCE TO RELATED APPLICATIONS

This application is a divisional of U.S. patent application Ser. No. 11/469,785, filed Sep. 1, 2006, which claims the benefit under 35 U.S.C. §119(e) of U.S. Provisional Application No. 60/713,812, filed Sep. 2, 2005, both of which are hereby incorporated herein by reference.

TECHNICAL FIELD

The present disclosure relates to annotating electronic documents, and more particularly to searching and evaluating shared annotations associated with selected portions of an electronic document.

BRIEF DESCRIPTION OF THE DRAWINGS

Non-limiting and non-exhaustive embodiments of the disclosure are described, including various embodiments of the disclosure with reference to the figures, in which:

FIG. 10 is a chart illustrating the frequency with which portions of an electronic document are annotated by an example annotation population according to one embodiment;

FIG. 11 is a general representation of a computer user interface for displaying frequent annotations according to one embodiment;

DETAILED DESCRIPTION

The embodiments of the disclosure will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

I. System Overview

Figure 1:
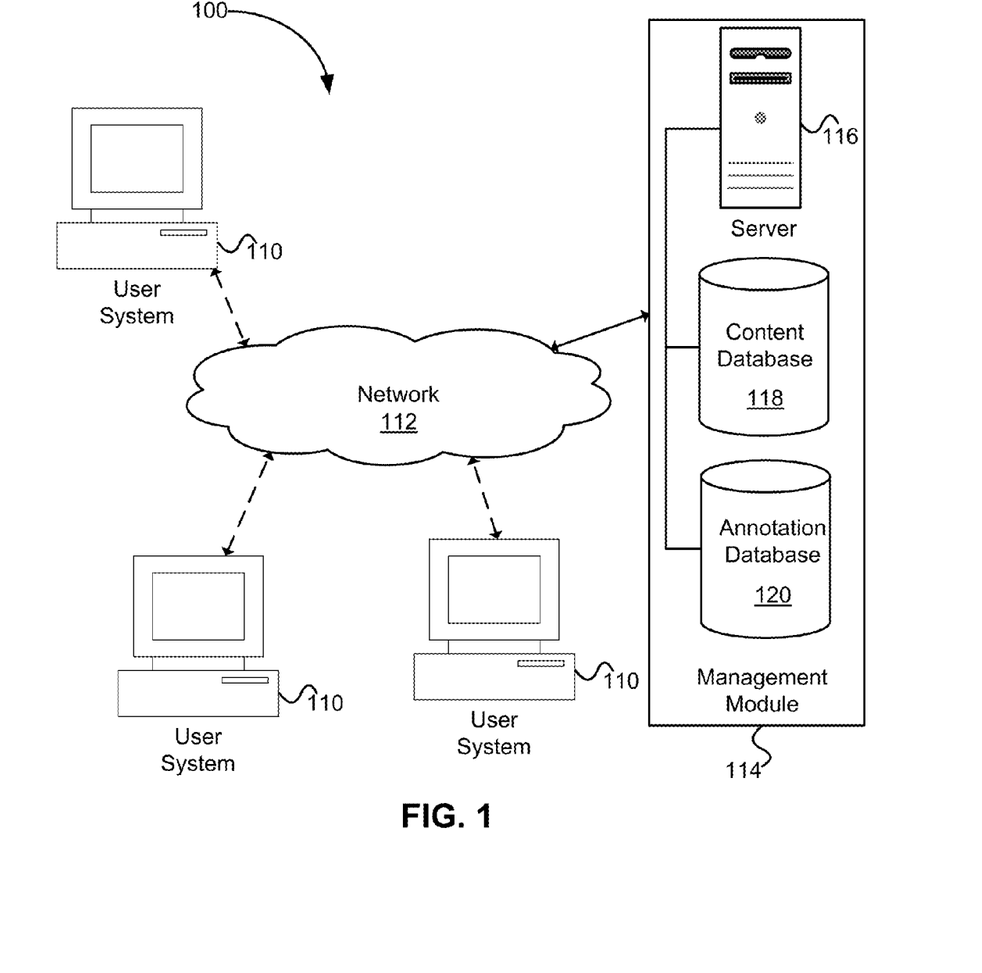
FIG. 1 is a block diagram of a system for creating and exchanging annotations within a community of user systems according to one embodiment.

FIG. 1 is a block diagram of a system 100 for creating and exchanging annotations (also referred to herein as notes) within a community of user systems 110 according to one embodiment. The annotations are associated with, and are displayable with, a portion of an electronic document. The electronic document may be, for example, an electronic book, textbook, article, academic paper, business document, government document, handout, presentation, note book, drawing, picture, a combination of the foregoing, or any other document that can be stored on a computer readable medium and displayed on a computer screen or other display device.

As discussed in detail below, the system 100 allows one or more of the users associated with the user systems 110 to be an "author" of an annotation associated with content in an electronic document. An author can create text, drawings, and/or other markings as part of an annotation and associate the annotation with a selected portion of text or other content in the electronic document. The author of the annotation can then classify the annotation and distribute the annotation to the other users. The other users can then display the annotation in their respective copies of the electronic document.

The users can also evaluate the annotation and/or the author. The evaluations can be shared among the user systems 110 so as to assist the users in deciding the value or usefulness of the annotation. In one embodiment, an annotation ranking is based on the number of other users that adopt the annotation by displaying it in their own copy of the electronic document and/or sharing the annotation with others. However, some users may never bother to adopt annotations that they find useful because adoption adds another step and is not always required in order to use the annotations. Thus, in some embodiments, the users are prompted with a message similar to "Was this note useful to you?" In one embodiment, the users may rank only others' annotations, not annotations that they authored themselves.

In one embodiment, the author defines permissions for the annotation that allow a subset of the user systems 110 to access the annotation. For example, a professor may grant access to students currently registered for a particular course. As other examples, members of a business organization, study group or book club can grant access to other members of their group.

Once a collection of annotations is established from a group of contributing authors, the users may subscribe to desired annotation feeds and/or search for annotations relevant to a selected portion of an electronic document (e.g., chapter, section, sub-section, paragraph, word, etc.). The search may be based on key words, permission levels, a particular author, authors in a user's group (class, business, study group, book club, etc.), an author ranking based on other users' evaluations of the author, an annotation ranking based on other users' evaluations of relevant annotations, annotation categories, or other desired annotation characteristics.

In one embodiment, the system 100 indicates to the users can view which portions of the electronic document are frequently annotated by other users. In addition, or in other embodiments, the users can view which words in the electronic document are frequently highlighted and/or used in annotations by other users. Thus, the users can quickly focus on key words or portions of the electronic documents that other users have focused on.

In one embodiment, the user systems 110 exchange annotations and/or electronic documents through a network 112. The network 112 may include, for example, the Internet or World Wide Web, an intranet such as a local area network (LAN) or a wide area network (WAN), a public switched telephone network (PSTN), a cable television network (CATV), or any other network of communicating computerized devices. However, as indicated by the dashed lines in FIG. 1, the user systems 110 can annotate electronic documents, classify annotations, evaluate annotations, and perform other operations described herein without being in communication with the network 112 or by only occasionally communicating through the network 112.

In addition to the user systems 110 distributing annotations and/or electronic documents directly to one another through the network 112, or in other embodiments, the system 100 includes a management module 114 that stores and distributes user-authored annotations and corresponding electronic documents. The management module 114 includes a server 116, a content database 118, and an annotation database 120. An artisan will recognize from the disclosure herein that the server 116, the content database 118, and the annotation database 120 can be implemented on one or more computers. These computers may be single-processor or multiprocessor machines and may include memory having software modules or coded instructions for performing the processes described herein.

The content database 118 comprises electronic documents that the users can purchase, license, or otherwise download through the server 116. The electronic documents may be provided, for example, by book publishers, professors or teachers, schools, businesses, groups or individuals. Thus, the electronic documents may be provided to the content database 118 by a third party (e.g., a publisher) or by one or more of the user systems 110. In one embodiment, the electronic documents include searchable text. However, the content database 118 may also include graphics, pictures, and/or non-searchable text (e.g., a non-searchable PDF file).

After downloading or otherwise obtaining a copy of an electronic document stored in the content database 118, a user can add annotations to the electronic document. If desired, the user can then upload the annotation to the annotation database 120. One or more of the other user systems 110 that have access rights can then download the annotation for use with their own copy of the electronic document.

In one embodiment, contributing annotation authors may elect to give their annotations away for free or provide their annotations for compensation in an electronic annotations marketplace. For example, an author may grant subscribing users access to all or a portion of the author's current and/or future annotations in exchange for fixed fee. In one embodiment, an author may grant subscribing users access to annotations that cover only a portion of the text for a fee (e.g., a chapter-by-chapter fee). In another embodiment, an author may choose to grant users access to all or a portion of the author's annotations for a subscription fee.

II. Creating Annotations

Figure 2:
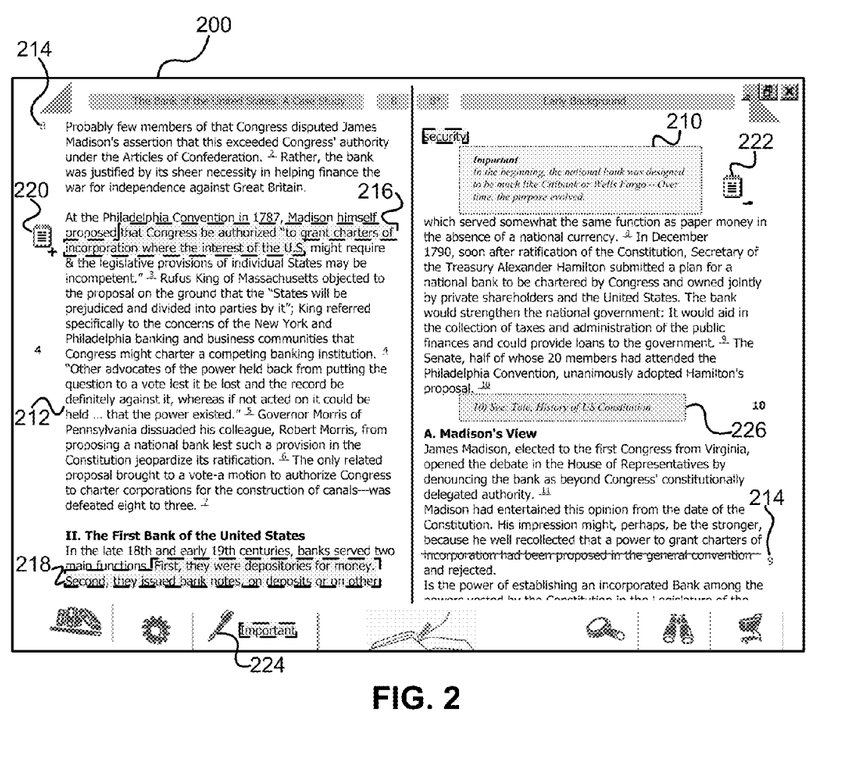
FIG. 2 is a general representation of a computer user interface for creating and viewing annotations associated with an electronic document according to one embodiment.

FIG. 2 is a general representation of a computer user interface 200 for creating and viewing annotations 210 associated with an electronic document 212 according to one embodiment. In this example embodiment, the user interface 200 displays the electronic document 212 in two columns and includes page indicators 214 (two shown) to indicate where page numbers in a corresponding hardcopy (e.g., printed book) of the electronic document 212 begin.

To create an annotation, a user highlights or marks a portion of the electronic document 212 to be associated with the annotation. As shown in FIG. 2, for example, the user has marked a first highlighted portion 216 and a second highlighted portion 218 of text associated with respective annotations. Upon highlighting the text, note icons 220, 222 appear in the margins of the electronic documents next to the first highlighted portion 216 and the second highlighted portion 218, respectively.

Figure 3:
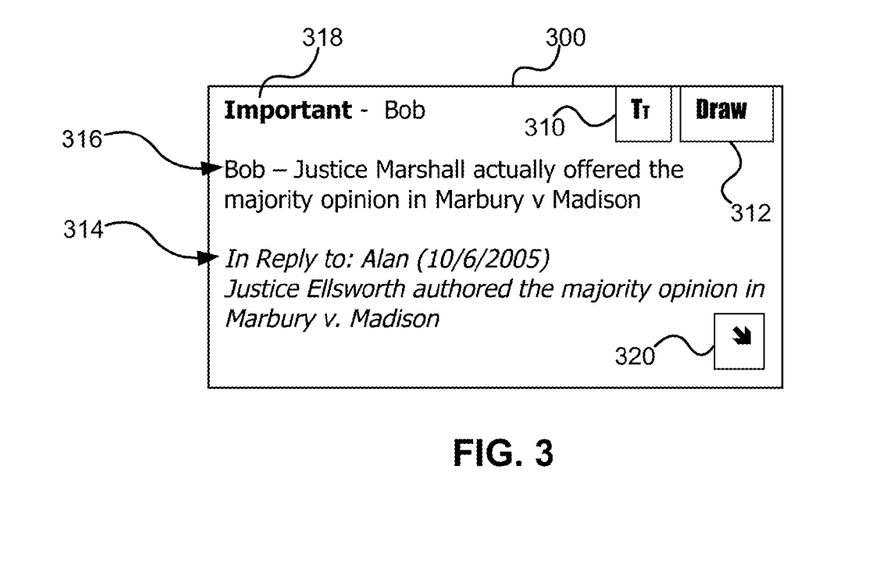
FIG. 3 is a general representation of a computer user interface for creating annotations according to one embodiment.

The user selects the note icons 220, 222 to create, edit or view annotations associated with the selected note icon 220, 222. In one embodiment, selecting one of the note icons 220, 222 displays a note window, such as the note window 300 shown in FIG. 3. As shown in FIG. 3, the user can type in the note window 300 (e.g., by selecting a "Tt" button 310) or draw in the note window 300 (e.g., by selecting a "Draw" button 312). Selecting the Draw button 312 allows the user to attach or sketch an electronic image on a virtual canvas.

The note window 300 may include annotations created by more than one user. For example, as shown in FIG. 3, a first user named "Alan" created a first annotation 314 and a second user named "Bob" created a second annotation 316. In this example, Bob is a current user and has marked the corresponding portion of his copy of the electronic document using a style labeled as "important" 318, as discussed below. After viewing or editing the annotation, Bob can save the contents of the note window 300 and return to the user interface 200 by selecting a return button 320.

Returning to FIG. 2, a user can highlight portions of the electronic document 212 without adding additional annotations (e.g., text or drawings). For example, the user may highlight the first highlighted portion 216 causing the note icon 220 to appear. However, if the user ignores the note icon 220, the note icon 220 will disappear after a predetermined amount of time or after the user performs another action (e.g., highlighting the second highlighted portion 218), leaving just the highlight on the first highlighted portion 216.

In one embodiment, if the user selects (e.g., right-clicks) a previously highlighted portion that does not have an associated annotation, a contextual menu (not shown) may appear that includes a "make note" command that may be selected to display a note icon, such as note icons 220, 222, in the margin next to the selected highlighted portion. As discussed above, the note icon can then be used to create an annotation corresponding to the highlighted portion. In addition, or in other embodiments, the user may use a text tool and menu selections to create an annotation without highlighting the associated text in the passage. In such embodiments, the annotation's style, as discussed below, can be changed using a right-click contextual menu or other menu item.

Figure 4:
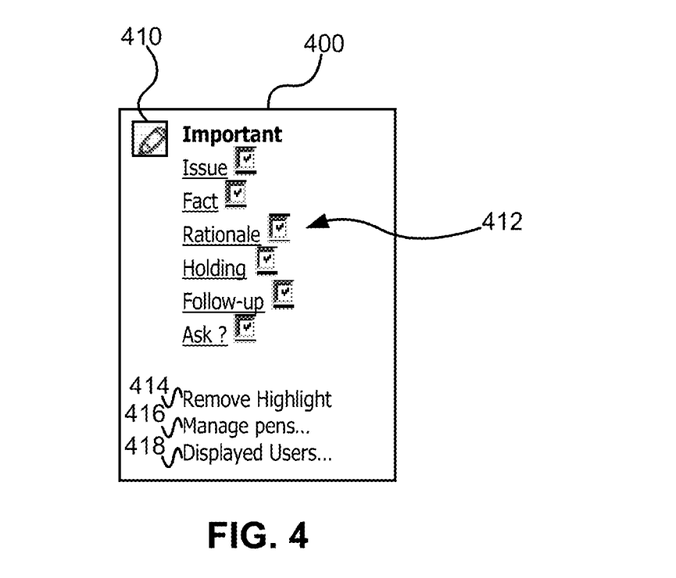
FIG. 4 is a general representation of a computer user interface for defining an annotation style according to one embodiment.

In one embodiment, the user interface 200 includes a pen icon 224 for displaying options for the creation and management of highlighting or pen styles. A pen style is a color and/or descriptive name used to categorize text highlights and annotations. The user can select the pen icon 224 to display a style menu, such as the style menu 400 shown in FIG. 4. As shown in FIG. 4, the user may change a currently selected pen style that will be used on newly created text highlights and annotations. Styles may be created to distinguish between different types of annotations such as important, issue, fact, rationale, holding, follow-up, ask, or other pre-defined or user-created labels to help the users distinguish between different types of annotations. A pen icon 410 in the style menu 400 represents a currently selected style (e.g., the "important" style in this example). Checkboxes 412 in FIG. 4 control the visibility of each pen style within the text of the electronic document 212.

The user can use the style menu 400 to toggle the display of different pen styles within the text, open dialog windows to add/duplicate/edit/delete pen styles, choose between multiple highlight styles, and/or open a dialog to toggle the display of annotations from other users and/or groups. For example, the user can select a "remove highlight" link 414 to hide highlighting for selected text, a "manage pens" link 416 to open a dialog interface where the user can add/copy/edit/delete pen styles and/or select pen style colors (e.g., from a color palette), and a "displayed users" link 418 to open a dialog interface where the user can select which users' annotations to display.

Returning to FIG. 2, the note icons 220, 222 indicate when an annotation is available. In one embodiment, a plus sign ("+") next to the note icon 220 indicates that the associated annotation is collapsed and can be viewed by selecting the note icon 220. A minus sign ("−") is displayed next to the note icon 222 to indicate that the associated annotation 210 is already expanded (e.g., visible) and can be collapsed by selecting the note icon 222. Once expanded, the body of text may "slide apart" after the highlighted passage 218 such that the content of the annotation 210 appears "inline" inside a box with a background colored to match the associated text highlight.

In the embodiment shown in FIG. 2, the margins of the annotation's text are indented slightly from both sides from the rest of the electronic document's text. The background box is as wide as the electronic document's text margins with the annotation's text inset from box edges. This allows the user to view an annotation without obscuring any text. The user may choose, for example, to leave the annotation 210 (or all annotations) open inline in the text of the original electronic document 212.

In one embodiment, annotation display control is available from a right-click contextual menu (on either an open annotation or on the note icons 220, 222) that allows the user, for example, to expand and/or collapse all annotations, expand and/or collapse a selected annotation, show only annotations with selected styles (via a cascading menu with "checked" and "unchecked" styles), and/or show only annotations from selected other users/groups (via a cascading menu with "checked" and "unchecked" names).

As shown in FIG. 2, a footnote 226 of the original electronic document 212 can be displayed in an "inline" fashion similar to the annotation 210. However, in certain embodiments, the footnote 226 is displayed using a different background color than that of the annotation 210 to provide visual differentiation between the footnote 226 and the annotation 210 (e.g., the footnotes are part of the original text and cannot be directly edited or deleted). This considerably simplifies the challenge of placing the footnotes at the bottom of the virtual page. It is not necessary in some embodiments for footnotes to have an icon since a superscript numeral (see superscript numerals 2-11 in FIG. 2) already exists and can be used to toggle the display of the footnotes. In one embodiment, footnotes have a right-click command to expand/collapse all or some of the footnotes.

III. Collaborative Note Taking

A. Granting Access to Annotations

At any point in the annotation creation process, an annotation author may access the management module 114 shown in FIG. 1 to select other users or groups that can access the author's annotations and to define the level of access that each of the users or groups receive.

For example, the management module 114 allows the annotation author to look up student users (possibly limited by school or class) and to designate groups of students who form a virtual study group. The selected users receive invitations to join the study group and may be required to opt-in by allowing access to their annotations before they can view the annotations of other group members. Such a group becomes "must share to see," meaning nobody gets to be a lurker and a user can only get others' annotations by sharing their own annotations.

Annotations may be shared according to one embodiment in a one-way direction. For example, a professor may create a study group and invite all of the professor's students to participate in the group. Each participating student in the group has access to the annotations created by the professor. In one exemplary embodiment, the students must explicitly opt-in before their annotations are shared with anyone. An exception is the case of a reply whereby the originating student is sent the reply regardless of whether he has read access to the replying student's annotations. For example, a student could reply to a professor's annotation although the professor would not normally see the student's day-to-day notes.

B. Synchronizing Shared Annotations

At any point in time, a user system 110 may initiate a synchronization process with the management module 114 using networking protocols to upload the user's most recent set of shared annotations for other users to access. The synchronization process also downloads annotations from one or more of the other user systems 110 that have been made available to the user. Artisans will recognize from the disclosure herein that direct connections between the user systems 110 and the management module 114 may be made using wireless or wired networking technology.

A user may also synchronize the user's computer (e.g., laptop computer, desktop computer, handheld device, etc.) with desktop software running on the user's computer. The user's annotations stored on the user's computer are merged with the annotations on the desktop software. In this way, the user's annotations are backed up in multiple, redundant places. The desktop software can make scheduled connections to the server 116. A menu item allows the user to connect to the server 116 on demand (if a network connection is available). The user may also specify a preference that allows the user to schedule regular connections for updates. Downloaded annotations are queued up for transfer to the user's computer during the next desktop-to-device synchronization.

C. Displaying Synchronization Results

Figure 5:
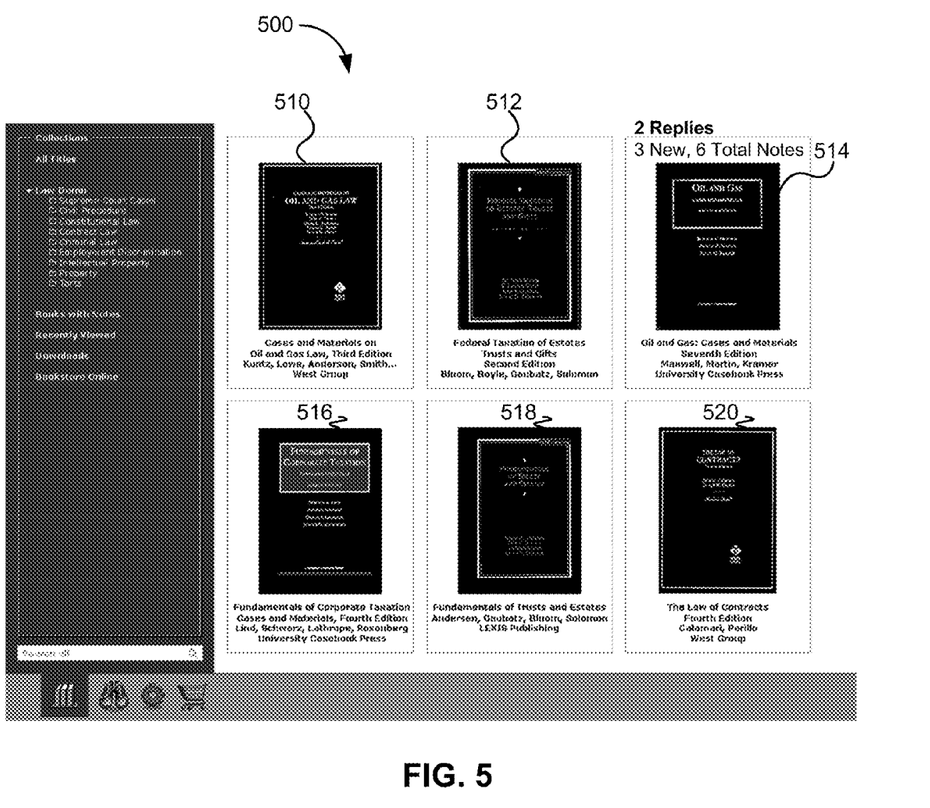
FIG. 5 is a general representation of a computer user interface for accessing annotations from multiple users according to one embodiment.

FIG. 5 is a general representation of a computer user interface 500 for accessing annotations from multiple users according to one embodiment. As shown in FIG. 5, a user can view the results of the synchronization process in a bookshelf view, which lists electronic books 510, 512, 514, 516, 518, 520 that the user can purchase, license or otherwise download from the management module 114.

Synchronized annotation information is displayed for each displayed book 510, 512, 514, 516, 518, 520. For example, a count of replies, new annotations, and total annotations is displayed next to the book 514. An artisan will recognize from the disclosure herein that other information can also be displayed such as a count of updated (edited) annotations corresponding to the book 514. Thus, the user can use the user interface 500 when selecting which of the electronic books 510, 512, 514, 516, 518, 520 or other electronic documents to buy or license from the management module 114. The user can also use the user interface 500 to know when new or edited annotations are available.

D. Summarizing Annotations

Figure 6:
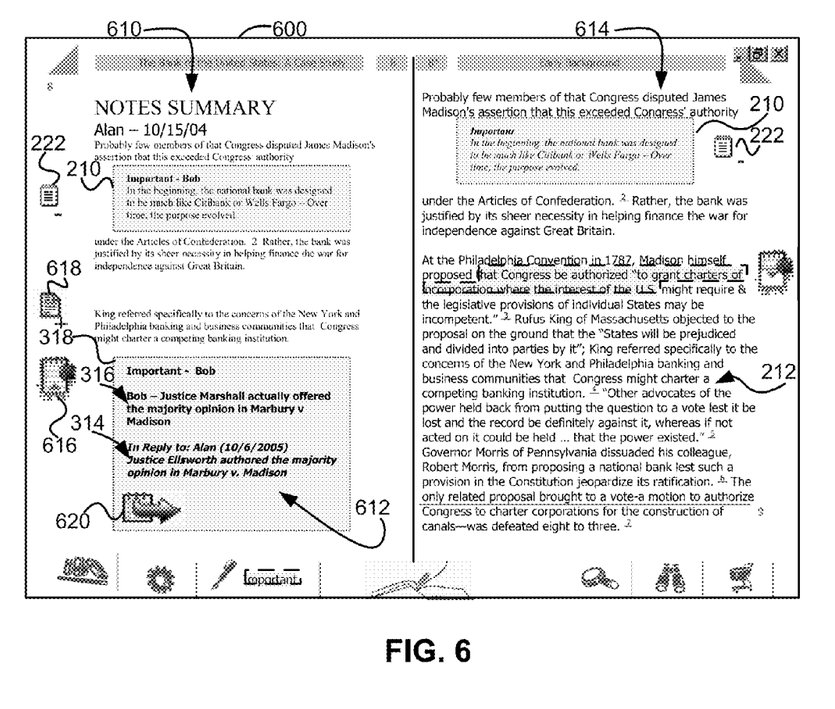
FIG. 6 is a general representation of a compute user interface for viewing side-by-side annotation summaries and full-text according to one embodiment.

FIG. 6 is a general representation of a compute user interface 600 for viewing side-by-side annotation summaries and full-text according to one embodiment. The left side 610 of the user interface 600 includes a summary of all or a selected portion of the annotations and replies (e.g., one or more of the user's responses to another user's annotation) together with a few lines of corresponding text in the electronic document. As shown in an annotation 612, in one embodiment, newly received annotations and replies are displayed in bold text, for example, until reviewed by the user. This is similar to email programs (e.g., Microsoft Outlook) that display unread emails in bold to help guide users to unopened messages. An artisan will recognize from the disclosure herein that other indicia (e.g., colors, fonts, underlining, italicization, etc.) could also be used to alert users to new or previously unseen annotations or replies.

Selecting the annotation 210 in the left side 610 of the user interface 600 causes the full text of the electronic document 212 corresponding to the selected annotation 210 to be displayed in the right side 614 of the user display 600. Thus, the user can quickly navigate through annotations and view corresponding text for desired annotations.

At any time, the user may toggle the visibility of annotations from other users using, for example, a right-click contextual menu on an annotation note icon 222, or through a view menu (not shown). In one embodiment, there is also a dedicated menu to control the different aspects of displaying the annotations and other aspects of the electronic document 212.

In one embodiment, an icon 616 in the margin of the electronic document 212 signifies that an annotation is available from another user. As shown in FIG. 6, the icon 616 has a different appearance than an icon 618 corresponding to a user's own annotations. In another embodiment, to differentiate between a user's own annotations and other users' annotations, an icon corresponding to a user's own annotations may be a first color and an icon corresponding to an annotation created by another user may be a second color. As another example, an annotation created by multiple users may be indicated by a "stacked notes" icon (not shown) to represent multiple annotations associated with the same text. Associated user names may be displayed in a tooltip fashion on rollover (e.g., by moving the tip a pointer tool over the stacked notes icon). Once the stacked notes icon is expanded, the body text "slides apart" after the highlighted passage, the annotation content appears "inline" inside a box with a colored background and the user name of the originating annotation author appears next to the text. The margins of the annotation text are indented slightly from both sides from the rest of the book text. See, for example, the annotation 612.

Figure 7:
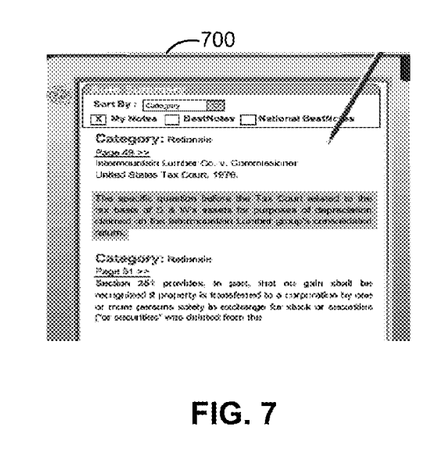
FIG. 7 is a general representation of a computer user interface for selecting annotations included in an annotation summary according to one embodiment.

FIG. 7 is a general representation of a computer user interface 700 for selecting annotations included in an annotation summary according to one embodiment. A user may use the user interface 700, for example, to hide blocks of content that have not been annotated by a designated group of users. The effect is to emphasize the content the user and the user's trusted circle of peers feel deserves additional attention. The designation of "important" content occurs inconspicuously each time a user adds an annotation. By definition, less important pieces of content will be annotated less frequently.

In one embodiment, the user interface 700 displays the chapter, section, and page number(s) of each piece of selected content. The user interface 700 also displays relevant content including two sentences before an annotation and two sentences after an annotation. In one embodiment, the amount of included content before and after the annotation is a customizable property. The user interface 700 also displays the annotations.

The user interface 700 allows the user to filter and sort annotations included in the annotation summary. Such filtering and sorting may be based on annotation characteristics such as an annotation's author, an annotation's category, and an annotation's appearance in the text of an electronic document (e.g., filter just those annotations that appear within several ranges of pages).

E. Available Actions on Created Annotations

The user may select an annotation and right-click (or equivalent) to expose a contextual menu (not shown) for the annotation. In one embodiment, the options under the contextual menu include, for example, edit, copy, reply, adopt, ignore, show all, hide all, show/hide by category, show/hide by user/group, and delete. Each of these options are briefly discussed below.

The "edit" option allows the user to modify previously entered content. Alternatively, the user may simply click on an annotation to set focus on the selected annotation and start editing. According to one embodiment, the users can edit only their own annotations. The "copy" option copies the content of the annotation to a system clipboard for use as another identical annotation within the application or for export to another program, such as a word processing program.

The "reply" option allows the user to reply to another annotation regardless of whether the annotation was posed as a question. In one embodiment, the reply includes the content from the originating annotation (similar to an email) without identifying the originating author. The reply annotation can be sent to just the original author or to everyone in the original annotation distribution. In addition, or in another embodiment, a small reply icon 620 (shown in FIG. 6) is available in the annotations to allow quick responses.

For example, the annotation 612 shows an annotation made by user "Alan" stating that "Justice Ellsworth authored the majority opinion in Marbury v. Madison." Alan's annotation is shared with other users including "Bob and Callie" In response, Bob replies to Alan's annotation and states "Justice Marshall actually offered the majority opinion in Marbury v Madison." Bob's annotation is shared back to Alan as well as another user who, for example, was not included on the original thread but understands the annotation because the original content was included. After synchronizing his device, Alan sees that he has received a reply to one of his annotations. Only after Alan takes some form of corrective action and synchronizes his device will Callie receive the corrected content since she is not a subscriber to Bob's reply.

The "adopt" option allows a first user to adopt an annotation authored by a second user such that the second user's annotation is imported into the first user's own personal set of annotations and shared as if the first user authored the annotation. In one embodiment, the server 116 tracks an annotation's "pedigree" to avoid the possibility of an infinite loop (e.g., Bob and Neal are sharing annotations, Neal adopts Bob's annotation, that annotation is now shared back to Bob, who doesn't really need it).

The "ignore" option allows a user to permanently hide annotations selected while reviewing annotations authored by other users. The "show all" option expands all annotations from users/groups that are toggled to display. The "hide all" option collapses all annotations. The "show/hide by category" option allows a user to toggle the display of annotations based on the annotations category (style). The "show/hide by user/group" option allows a user to toggle the display of shared annotations based on their ownership or the owner's group membership. The "delete" option allows a user to remove an annotation totally. In one embodiment, a deletion is indicated in others' bookshelves as an updated annotation. If there is a reply thread attached to the annotation, the annotation's content is replaced with a notation: "Note Deleted by Owner." The subset of the above commands that refer to a single, selected annotation are available, according to one embodiment, in the annotation as a note toolbar (which is available/active only on the selected annotation).

F. Querying for Annotations Associated with Selected Content

In one embodiment, when a user comes across content in an electronic document that they may not understand, the user has the option of highlighting the relevant content and selecting a "query for notes" option. When the user is connected to the network 112, an immediate request may be sent to the server 116 for annotations associated with the selected content. When the user is not connected to the network 112, the user is warned that no connection is available and that the query will be queued (via an alert dialog with a cancel and continue button set). If the user chooses to continue with the query, a reference to the selected content is placed in a dedicated queue until the next synchronization. During the next synchronization process, that queue of requests is broadcast to server 116.

In response to the request, the server 116 searches the annotation database 120 for annotations created by other users that are associated with the selected content and returns any matching annotations to the use. In one embodiment, only the highest ranked annotations, as judged by the number of user-adoptions, are communicated back to the initiating user system 110. The user may then review the annotations to gain a better understanding of the content.

IV. Annotation Scoring and Filtering

A. Overview

Over time, the annotation database 120 shown in FIG. 1 amasses a considerable number of annotations that describe the position of annotated text within electronic documents. The system 100 provides a variety of methods for scoring and filtering annotations so that the users can find and download the annotations that best fit their needs.

In one embodiment, the annotation database 120 is processed to determine which portions of selected electronic documents are the most frequently annotated by the users in various groups and/or among all of the users. A ranked list of the most frequently annotated content by each user group to which the user belongs, for example, is transmitted during each synchronization process. These lists can be displayed as highlighted text within the content itself. For example, a Stanford Law School student belonging to a Stanford Law Class of 2008 study group may receive a ranked list of the most frequently annotated content by his peers as grouped by class, school, nationwide set of users, other user groups, combinations of the foregoing, and the like.

B. Filtering Annotation Entries

The users can filter the annotations stored in the annotation database 120 so that they can download and/or display a desired set of annotations. For example, a student may want to download all annotations associated with a particular law school textbook. Depending on the number of available annotations for the textbook, the student may reduce the number of downloaded and/or displayed annotations by filtering for those annotations authored by other students who used the textbook for a particular professor's class or who are currently attending or attended a particular law school.

Figure 8A:
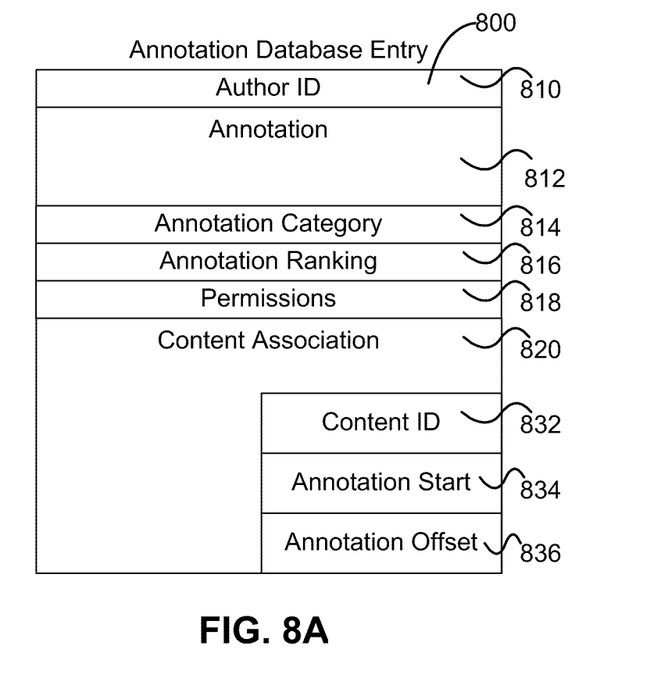
FIG. 8A is an annotation entry data structure according to one embodiment.

In one embodiment, the annotation entries stored in the annotation database 120 include categorization and filtering information. For example, FIG. 8A is an annotation entry data structure 800 according to one embodiment. The annotation entry data structure 800 includes an author identifier (ID) 810, an annotation 812, an annotation category 814, an annotation ranking 816, a permissions field 818, and a content association field 820.

Figure 8B:
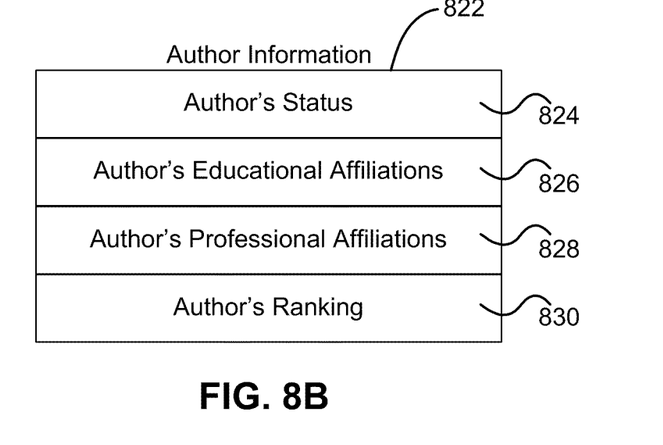
FIG. 8B is an author information data structure according to one embodiment.

The author ID 810 uniquely identifies the author of the annotation 812. In one embodiment, the author ID 810 includes a pointer to additional author information. For example, FIG. 8B is an author information data structure 822 according to one embodiment. The author information data structure 822 may be stored in the annotation database 120, or in another database, and includes information regarding a user who authored one or more annotations stored in the annotation database 120. The author information data structure 822 includes the author's status 824, the author's educational affiliations 826, the author's professional affiliations 828, and the author's ranking 830. The other users can access such author information to assist them in deciding what value or weight to give to annotations created by a particular author.

The author's status 824 indicates a position or title of the author. For example, the author's status 824 may indicate that the author is a professor, a teacher, a student, a teacher's aide, a project manager, a book or article author, a club organizer, or the like. The author's educational affiliations 826 indicate, for example, a school or university where the author attends, lectures, researches, and/or is otherwise associated. The author's professional affiliations 828 indicate, for example, the author's employer and/or professional organizations that the author represents or in which the author participates. As discussed below, the author's ranking 830 provides an indication of how the author has been evaluated by the other users with regard to one or more of the author's annotations stored in the annotation database 120. Thus, the author information data structure 822 allows the users to search for annotations created by particular authors, authors having a particular status, authors with particular affiliations, and/or authors having achieved a particular ranking.

Returning to FIG. 8A, the annotation 812 includes the text and/or graphics provided by the author identified in the author ID 810. The annotation category 814 includes filter parameters that characterize the annotation 812. In one embodiment, the author identified in the author ID 810 defines the annotation category 814 using pre-defined search terms or categories. For example, referring to FIG. 4, the author may categorize the annotation as important, an issue in a court opinion, a fact in the court opinion, a rationale in the court opinion, a holding in the court opinion, an annotation requiring follow-up, or an annotation that includes a question. Thus, for example, a law student may quickly download annotations related to the issue and holding of a selected court opinion. Other exemplary annotation filter parameters or categories are discussed below with respect to FIGS. 9A-9D.

When selecting an annotation or set of annotations to download from the annotation database 120, the other users may select one or more of the pre-defined search terms or categories used to filter the annotations in the annotation database 120. Thus, the other users can specify multiple annotation sources (also referred to herein annotation populations) and display them concurrently with a selected electronic document.

For example, FIGS. 9A-9D are general representations of computer user interfaces 910, 912, 914, 916 for selecting source annotation populations according to one embodiment. The author may use the user interfaces 910, 912, 914, 916, for example, when creating the annotation 812 and/or the other users may use the interfaces 910, 912, 914, 916 when searching for one or more annotations created by a particular annotation population.

Figure 9A:
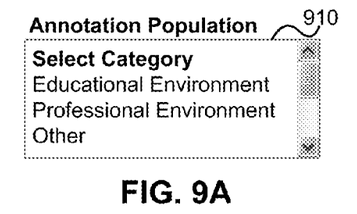
FIGS. 9A-9D are general representations of computer user interfaces for selecting source annotation populations according to one embodiment.

The user interface 910 allows the users to select an annotation population by selecting a pre-determined annotation category. The annotation categories may include, for example, an educational environment, a professional environment, or other environments. Depending on the user's category selection using the user interface 910, the user is allowed to make further selections using one or more of the user interfaces 912, 914, 916.

Figure 9B:
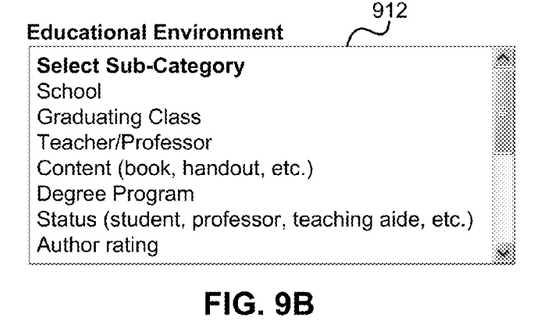

If, for example, the user selects the educational environment from the user interface 910, the user can then select a sub-category from the user interface 912. As shown in FIG. 9B, the sub-categories for the educational environment may include, for example, school, graduating class, teacher/professor, content (e.g., book, handout, etc.), degree program, status (e.g., student, professor, teaching aide, etc.), and/or author rating. The user may select school, for example, to be presented with a list of schools affiliated with authors contributing to the annotation database 120. The user may further select a particular textbook, for example, having annotations available that are associated with the selected school. The user may further select author rating, for example, to be presented with annotation author rankings for the displayed textbooks associated with the selected school.

Figure 9C:
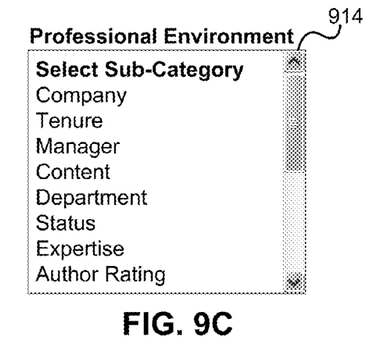
Figure 9D:
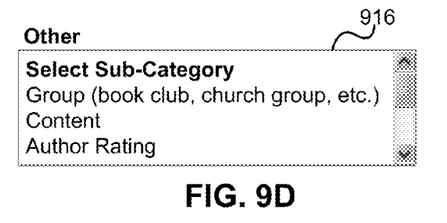

If the user selects the professional environment from the user interface 910, the user can then select a sub-category from the user interface 914. As shown in FIG. 9C, the sub-categories for the professional environment include, for example, company, tenure, manager, content, department, status, expertise, and author rating. If the user selects "other" from the user interface 910, the user can then select a sub-category from the user interface 916. As shown in FIG. 9D, the sub-categories for "other" include, for example, group (e.g., book club, church group, etc.), content, and author rating.

In one embodiment, the users can also define custom search terms to search for annotations. The custom search terms may be used with or without the pre-defined categories and sub-categories. As discussed above, in one embodiment, the users can highlight a portion of an electronic document to be used as a search parameter. For example, the location of the highlighted portion may be used to search for annotations associated with the highlighted portion. Thus, the users can define the exact set of annotations to search for such that they download annotations from the annotation database 120 that most closely match the search parameters, text position, and permissions granted by the annotation author.

Returning to FIG. 8A, the annotation ranking 816 includes an indication of how the annotation 812 has been evaluated by the other users. Annotation rankings will be discussed in further detail below with respect to FIG. 13. The permissions field 818 defines which of the users are authorized to access the annotation 812. In one embodiment, the author identified in the author ID 810 sets the permissions field 818. The permissions field 818 may be based on a list of subscribers who have paid to receive the author's annotations or a portion of the author's annotations. In addition, or in another embodiment, the permissions field 818 may be based on one or more groups in which the author is participating. The users are allowed to search and/or download only those annotations for which they have been granted permission.

The content association field 820 includes data that uniquely identifies a portion of the electronic document that the author has associated with the annotation 812. Thus, the users can search for annotations associated with a particular portion of a selected electronic document. The content association field includes a content identification (ID) field 832, an annotation start field 834, and an annotation offset field 836. The content ID field 832 uniquely identifies an electronic document stored in the content database 118. As discussed above, the electronic document may include, for example, an electronic book, textbook, article, academic paper, business document, government document, handout, presentation, note book, drawing, picture, a combination of the foregoing, or any other document that can be stored on a computer readable medium and displayed on a computer screen or other display device.

The annotation start field 834 identifies a unique location within the associated electronic document where the annotation 812 begins. The annotation start field 834 may specify, for example, a chapter, section, sub-section, paragraph, page number, or line number. In addition, or in other embodiments, the annotation start field 834 specifies a number of characters from the start of the electronic document as the location where the annotation 812 begins. The annotation offset field 836 specifies the number of characters from the start of the annotation 812 to the end of the annotation 812. In another embodiment, an end point is specified rather than an offset from the start location. In one embodiment, the content association field 820 is automatically generated as an annotation address when the author highlights a portion of the text and creates the annotation 812.

C. Ranking Frequently Annotated Passages

In one embodiment, the server 116 is configured to determine frequently annotated portions of the electronic documents in the content database 118. The server 116 analyzes a selected source annotation population of a selected electronic document to rank which passages received a comparatively high level of user attention as measured by the degree to which annotation authors highlighted and annotated the associated text. Thus, a student, for example, may quickly determine which portions of an electronic document are frequently considered important by other students.

Further, the student can filter the annotations so as to show annotations for a selected number of most frequently annotated portions of the electronic document. For example, the student may decide to view annotations for only the top ten most frequently annotated passages in a selected chapter. As another example, the student may decide to view annotations for only frequently annotated passages that include a certain number of words or that include a frequently used word.

FIG. 10 is a chart 1000 illustrating the frequency with which portions of an electronic document are annotated by an example annotation population according to one embodiment. In this example, the annotation population comprises the New Haven Law School, class of 2010 and the electronic document comprises a textbook titled "Cases and Problems of Software Patent Law $3^{rd}$ Edition." The chart 1000 displays which portions of four paragraphs (shown as Paragraph 1, Paragraph 2, Paragraph 3, and Paragraph 4) of the textbook have been highlighted and annotated by four annotation authors (shown as author A, Author B, Author C, and Author D) from the class of 2010.

As shown in FIG. 10, notes from Author A are associated with portions of all four paragraphs. Notes from Author B are associated with portions of Paragraph 1, Paragraph 3, and Paragraph 4. Notes from Author C are associated with portions of Paragraph 1 and Paragraph 3. Finally, notes from Author D are associated with portions of Paragraph 1.

In this example, a user has selected a first portion 1010 (corresponding to Paragraph 1) and a second portion 1012 (corresponding to Paragraph 3) for which the user desires to receive annotation frequency rankings. In other embodiments, the user may specify a book, chapter, page, or paragraph for which the user desires to find frequently annotated passages. In such an embodiment, the server 116 determines that the portions 1010, 1012 and/or the Paragraphs 1 and 3 have been frequently annotated and notifies the user.

The server 116 analyzes the annotations provided by the four authors, the first portion 1010, and the second portion 1012 to determine the frequency with which the four authors annotated the first portion 1010 and the second portion 1012. Based on the frequency, the server 116 assigns a rank or value to the first portion 1010 and the second portion 1012. The value may also be based on factors such as a degree to which the frequently annotated portions have been annotated, the size of the annotations, and/or the number of frequently used words in the annotations.

In this example, the first portion 1010 was annotated by each of the four authors and the server 116 has assigned the first portion 1010 a rank of "1." Thus, a rank of "1" indicates that all or a large percentage of authors believe that the first passage 1010 includes important or relevant information. Based on the high ranking, the user may decide to download and display one or more annotations corresponding to the first portion 1010 and/or carefully read the first portion 1010.

The second portion 1012 was annotated by two of the four authors and the server 116 has assigned the second portion a rank of "2" to indicate that a smaller percentage of contributing annotation authors believe that the second portion 1012 includes important or relevant information. An artisan will recognize from the disclosure herein that other ranking systems can also be used. In addition, or in other embodiments, the server 116 may indicate the percentage of contributing users that annotated the first portion 1010 and the second portion 1012.

In one embodiment, the server 116 periodically regenerates the rankings and/or regenerates the rankings when additional annotations associated with the textbook are added to the annotation database 120. The server 116 then provides the rankings to the user systems 110 through the network 112. The server 116 may provide the rankings, for example, to all of the users that have downloaded the textbook. Alternatively, the server 116 may provide the rankings only to those users that are included within the annotation population (e.g., students in the class of 2010 that are attending New Haven Law School). In one embodiment, rankings for the paragraphs that include the selected portions 1010, 1012 are also provided. For example, the server 116 has ranked Paragraph 1 with a ranking of "1" and Paragraph 2 with a ranking of "2."

FIG. 11 is a general representation of a computer user interface 1100 for displaying frequent annotations according to one embodiment. The user interface 1100 includes frequency indicators 1110, 1112, 1114, 1116 in the margins of an electronic document to indicate frequently annotated portions of the electronic document. The frequency indicators 1110, 1112, 1114, 1116 display respective frequency ranks (e.g., 1, 2, 3, etc.) and the population source providing the ranking.

In one embodiment, the users select the frequency indicators 1110, 1112, 1114, 1116 to view the population source (e.g., selecting the down arrow next to the word "Source" displays the annotation population used to create the frequency ranking).

The frequency indicators 1110, 1112, 1114, 1116 point to respective portions of the electronic document that have been frequently annotated. For example, the frequency indicators 1110, 1116 point to respective brackets used to indicate paragraphs or portions of paragraphs that have been frequently annotated. As other examples, the frequency indicator 1112 points to a frequently annotated section heading (e.g., "II. The First Bank of the United States") and the frequency indicator 1114 points to a highlighted portion of text that has been frequently annotated. In one embodiment, each user may decide which ranking levels to display. For example, a user may decide to display only those frequency indicators having a ranking of 1 or 2.

D. Determining Frequent Words Used in Annotations

Figure 12:
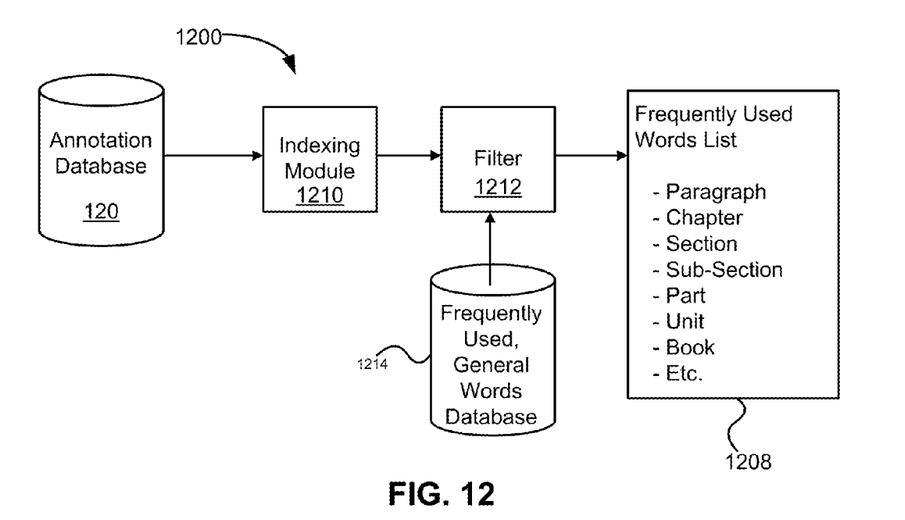
FIG. 12 is a block diagram of a sub-system for creating a frequently used word list according to one embodiment.

In one embodiment, the server 116 is configured to determine words used frequently in annotations stored in the annotation database 120. For example, FIG. 12 is a block diagram of a sub-system 1200 for creating a frequently used word list 1208 according to one embodiment. The sub-system 1200 includes an indexing module 1210 configured to index the annotations in the annotation database 120 to create an annotation word index arranged by word frequency.

The sub-system 1200 also includes a filter 1212 configured to receive the annotation word index from the index module 1210 and to filter the annotation word index against a frequently used, general words database 1214. The filter 1212 uses the frequently used, general word database to filter out common words such as "and," "the," "a," "it," and other commonly used words. The output of the filter 1212 is the frequently used words list 1208 arranged by order of most frequently used words. The frequently used words list 1208 may be calculated on several different levels including, for example, paragraph, subsection, section, chapter, part, unit, and book.

In one embodiment, the frequently used, general words database 1214 is replaced with a database of words that are specific to a particular subject. For example, the database may consist of entries found in a legal dictionary or a medical dictionary. In such an embodiment, the filter 1212 produces an ordered list of frequently used legal terms found in the annotation database 120. An artisan will recognize from the disclosure herein that other subject-specific dictionaries could also be used including, for example, an engineering dictionary or a medical dictionary.

The server 116 downloads the frequently used words list 1208 to the user systems 110 via the network 112. The users can toggle the display of the frequently used words within a box or similar dialog which appears in a user interface. Matches to the "most-frequently" used words within a passage are stylistically highlighted in the text to communicate to the user that the other users have frequently noted that word within their own annotations. The users can specify how many of the most-frequently used to stylistically highlight. For example, a user may choose to display only the top two most commonly used words in a particular paragraph.

The user interface 1100 in FIG. 11, for example, displays the frequently used words list 1208. The list 1208 is in order of most-frequently used words and the user can select which words in the list to be stylistically highlighted in the text of the electronic document. In this example, the words "national bank," "Madison," "convention," and "authority" are stylistically highlighted (e.g., circled) within the text of the electronic document to indicate that these words are frequently used in other users' annotations.

The user interface 1100 also includes a control 1118 to specify the scope (e.g., chapter, section, paragraph, etc.) of the frequently used words list 1208. If a user selects "chapter," for example, the server 116 will highlight frequently used words found in annotations associated with a selected chapter. In one embodiment, the server 116 anticipates the correct scope based on the user's location within the content of the electronic document. The user interface 1100 also includes a control 1120 that allows users to create an "ignore list" of words that will not show up in the current or future frequently used words lists 1208. Thus, for example, a medical student can ignore uses of "heart" and "cardiac," while these words will be included for a ninth-grade biology student.

E. Annotation and Author Evaluations

Figure 13:
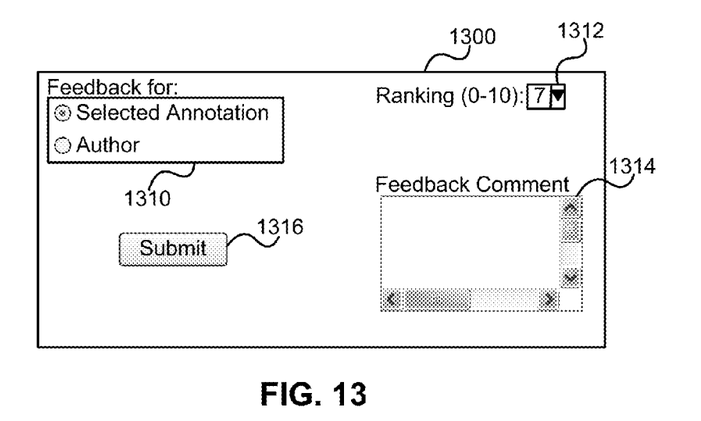
FIG. 13 is a general representation of a computer user interface for evaluating annotations and/or annotation authors according to one embodiment.

FIG. 13 is a general representation of a computer user interface 1300 for evaluating annotations and/or annotation authors according to one embodiment. The user interface 1300 includes a control 1310 for selecting between providing an evaluation or feedback for a selected annotation or an author of the selected annotation.

The user interface also includes a control 1312 that allows a user to specify a ranking for the selected annotation or author. As shown in FIG. 13, the control 1312 allows the user to rank the selected annotation or author on a scale of 0-10, with 0 being the lowest ranking and 10 being the highest ranking. However, an artisan will recognize from the disclosure herein that many different ranking systems could be used. For example, the control 1312 in other embodiments may allow the user to specify "thumbs up," "thumbs down," or "no opinion." As another example, the control 1312 may allow the user to specify whether the user is "Not likely to recommend the author," "likely to recommend the author," "very likely to recommend the author," or "no opinion."

In one embodiment, the user interface 1300 also includes a field 1314 that allows the user to enter feedback comments. The feedback comments allow the user to provide additional information as to why the user liked or disliked the selected annotation and/or author. Upon completing the evaluation, the user may select a submit button 1316 to communicate the evaluation to the server 116 where it is available for searching, sorting, and indexing purposes.

Each recipient of an annotation authored by another user may provide a quantitative score and/or qualitative feedback regarding the annotations. Factors used in providing the author evaluations may include, for example, relevance, clarity, insightfulness, combinations of the foregoing, and the like.

Annotation ratings may be used, for example, to determine an absolute scale of which annotation is considered by the other users to be the best annotation. For example, a student may choose to see the number one rated annotation for each paragraph in the book from the student's defined annotation population. As another example, a professional may choose to see all annotations rated greater than 4.5 (e.g., on average) or where more than two people have given a "thumbs-up."

Annotation evaluations can be used for determining an author evaluation. The combined use of several algorithms is recommended for inputs into an overall author evaluation. For example, an author evaluation may be determined from an average annotation rating across all the annotations that the author has created. As another example, an author evaluation may be determined based on counting the number of annotations from the author that are rated within the top decile (or quartile, half, etc.) of user annotations.

Author ratings are made available to other users looking to embed the best annotations within their copies of the electronic documents. The ratings system provides guidance to users as to which authors the global community of users has judged "best" or has judged as historically providing more valuable annotations than other authors. The users can use the population parameters described in the categorization section discussed above to filter for a subset of authors that fit their interests. These search results may include the evaluation scores that describe an author and the author's annotations. The users may also view a detailed profile of the author, which may include, for example, the evaluation scores and any qualitative feedback that the community has submitted.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A method of filtering electronic annotations, the method comprising:

receiving a search request comprising address information associated with a user-selected portion of an electronic document, the address information being automatically added to the search request upon a user's selection of the user-selected portion, wherein the user selected portion comprises a portion of the electronic document highlighted by the user, the address information uniquely identifying the electronic document and a location of the user-selected portion within the electronic document;

filtering a plurality of annotations to find a subset of the annotations that are associated with the user-selected portion;

filtering the subset of annotations based on how frequently a first sub-portion of the user-selected portion is annotated by a plurality of authors compared to how frequently a second sub-portion of the user-selected portion is annotated by the plurality of authors; and providing the subset of annotations to the user through a network.

2. The method of claim 1, further comprising filtering the subset of annotations based on frequently used words within the subset of annotations.

3. The method of claim 1, further comprising filtering the subset of annotations based on access rights granted to the user.

4. The method of claim 1, further comprising filtering the subset of annotations based on an identity of an author.

5. The method of claim 4, further comprising:
receiving one or more user-evaluations of an author of an annotation; and
deriving an author ranking from the one or more user-evaluations.

6. The method of claim 5, further comprising filtering the subset of annotations based on the author ranking.

7. The method of claim 1, further comprising filtering the subset of annotations based on an annotation ranking corresponding to one or more user-evaluations of the subset of annotations.

8. The method of claim 1, further comprising filtering the subset of annotations based on an annotation category.

9. The method of claim 8, wherein the annotation category corresponds to an annotation population.

10. A system accessible over a network for sharing electronic annotations of an electronic document, the system comprising:

a database for storing a plurality of user-authored annotations of the electronic document; and a server connected to the network and configured to:
receive from a user, over the network, one or more parameters for displaying desired user-authored annotations from the database, wherein the one or more parameters comprise address information associated with a user-selected portion of an electronic document, the address information being automatically added to the search request upon a user's selection of the user-selected portion, wherein the user selected portion comprises a portion of the electronic document highlighted by the user, the address information uniquely identifying the electronic document and a location of the user-selected portion within the electronic document, search the database and identify a subset of the annotations that match the received parameters, filter the subset of annotations based on how frequently a first sub-portion of the user-selected portion is annotated by a plurality of authors compared to how frequently a second sub-portion of the user-selected portion is annotated by the plurality of authors, and provide through the network the subset of annotations for display to the user.

11. The system of claim 10, wherein the received one or more parameters include at least one of an author identifier, an annotation category, an annotation ranking, and custom search terms.

* * * * *